United States Patent [15] 3,643,238

Bobeck et al.

[45] Feb. 15, 1972

[54] MAGNETIC DEVICES

[72] Inventors: Andrew H. Bobeck, Chatham; Le Grand G. Van Uitert, Morris Township, Morris Co., both of N.J.

[73] Assignee: Bell Telephone Laboratories Incorporated, Murray Hill, N.J.

[22] Filed: Nov. 17, 1969

[21] Appl. No.: 877,154

[52] U.S. Cl. .......... 340/174, 252/62.56, 252/62.57
[51] Int. Cl. .......... G11b 5/00
[58] Field of Search .......... 340/174; 252/62.51, 62.55, 252/62.56, 62.57, 62.59

[56] References Cited

UNITED STATES PATENTS 3,116,255 12/1963 Meiklejohn .......... 252/62.55 X

*Primary Examiner*—James E. Poer
*Assistant Examiner*—J. Cooper
*Attorney*—R. J. Guenther and Edwin B. Cave

[57] ABSTRACT

Local cobalt concentration inhomogeneities in bubble domain devices make possible a series of device designs in which various functions are expedited. These functions include bubble generation, bubble replication, bubble positioning and various logic functions. The exemplary materials are uniaxial rare earth and related orthoferrites in which small amounts of cobalt reduce anisotropy.

7 Claims, 4 Drawing Figures

INVENTORS A. H. BOBECK
L. G. VAN UITERT
BY George S. Indig
ATTORNEY

MAGNETIC DEVICES

BACKGROUND OF THE INVENTION

1. Field of the Invention

The invention is concerned with magnetic materials suitable for use in any of a class of devices utilizing small enclosed regions of opposite polarization variously known as "bubble" domain devices or "single-wall" domain devices. Devices in this class depend for their operation on the nucleation and propagation of such domains, their presence and/or position representing information "bits."

2. Description of the Prior Art

The general nature of bubble domain devices and some description of many of the forms that such devices may take is set forth in *The Bell System Technical Journal*, Volume XLVI, No. 8, Oct. 1967, pp. 1,901–1,925. The appeal of such devices is based on a number of characteristics including ease of the write and read functions, small power requirements, and on bit density. It has been estimated that with present circuit capability, bit density may appreciably exceed that of one bit per 100 square mils.

At this time one of the more promising classes of materials is the rare earth and related orthoferrites having the formula $AZO_3$, in which A is a rare earth, lanthanum, yttrium or bismuth ion, and Z is commonly trivalent iron. Many of these materials, for example, terbium orthoferrite, readily support bubble domains of the order of 3 mils in diameter at operating temperatures near room temperature. Other desirable device properties of these materials notably include the velocity at which bubbles may be caused to progress from one position to another at desirably low power levels.

Other materials have received attention for use in this class of devices. A prominent class may be designated as the hexagonal ferrites. These materials which include the magnetic magnetoplumbites contain spinellike blocks separated by layers containing large cations such as Pb, Ba, and the pair La–Na. These materials are known in a number of modifications, some of which have the desired uniaxial anisotropy, and some of which have planar easy directions. The latter materials are also usable providing an easy direction is induced. This may be accomplished in a variety of ways as, for example, by use of strain. Strain may be induced simply by use of vapor deposition on appropriate substrate materials.

Bubble domain devices are under active investigation by a number of workers and many variations have evolved. Variations are addressed to particular operating characteristics including, for example, means for generating bubbles both initially and during operation, to means for fixing stable bubble positions, to adjustment of bubble size and improvement in bubble mobility and to the accomplishment of various logic functions. Many of the means adopted for the achievement of these objectives, while useful, have obvious drawbacks. For example, a common method of initially introducing a bubble in an orthoferrite involves the local reduction of anisotropy by heating an appropriate region to a temperature approaching the reorientation temperature of the material. Stable bubble positions are frequently fixed by use of high-permeability magnetic circuitry such as small islands of permalloy. Bubble size and mobility has, in one configuration, been modified by minimizing the bubble area contacting a free surface, as by use of an overlay of soft magnetic material. Engineering and fabrication limitations in all of these techniques are apparent.

SUMMARY OF THE INVENTION

In accordance with the invention, many of the above-described functions are expedited by use of local concentration gradients of cobalt. Cobalt has a large anisotropy which is opposite in sign to that of the predominant ions making the essential magnetic contribution to the materials utilized in bubble devices. These local concentration gradients may be present as a planar region at a free surface of a layer or as an internal layer between adjoining higher anisotropy magnetic layers in which bubbles are nucleated and/or propagated. The effect of such configurations is seen in terms of bubble size and/or mobility. Gradients may also appear as local inhomogeneities which reduce anisotropy and thereby reduce the necessary field intensity for nucleating a bubble at such a site. Local concentrations may also be so arranged as to produce stable bubble positions. Other uses for such gradients are described.

A preferred embodiment of the invention is defined in terms of the rare earth orthoferrites and related orthoferrites. The effect of local cobalt addition on anisotropy in such materials is very large for small concentrations. In fact, necessary concentration gradients in these exemplary materials seldom exceed 1 atom percent based on Fe ion content. The advantages of working in these materials in terms of crystal growth and fabrication techniques are apparent.

DETAILED DESCRIPTION

Composition

Figure 1:
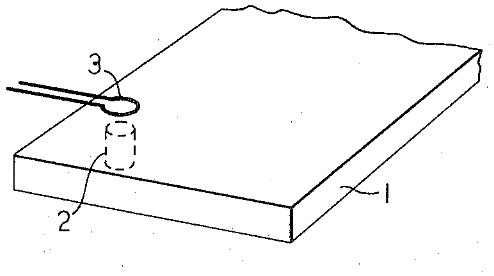
FIG. 1 is a perspective view of a portion of a bubble device containing a local cobalt inhomogeneity useful, for example, for generating bubble domains.

It has been indicated that the compositions utilized in accordance with the invention are those which are otherwise possessed of the appropriate device properties. For the bubble domain devices most significant for this invention, it is necessary that any composition have a uniaxial anisotropy. That is, a suitable material must manifest an easy magnetization direction relative to other crystal directions and the material must have sufficient anisotropy so that the easy direction may be made to lie outside the plane of the device. For these purposes the device contemplated utilizes one or more layers which may be self-supporting or may be supported by another layer or body. This layer or layers typically has two broad dimensions and one small dimension, the latter characteristically of the order of a few mils or as small as a fraction of a mil.

It is not considered within the necessary scope of this description to set forth all appropriate material variations. Briefly, suitable materials fall into two categories: the first typified by the rare earth orthoferrites and the second typified by the magnetoplumbites. The first class, having the stoichiometry, consists essentially of a composition of the approximate stoichiometry $AZX^{n}_{6/n}$ in which A consists essentially of at least one element selected from the group consisting of the 4*f* rare earth elements, Y, La, Bi, Ti, V, Cr, Mn, Fe and Ni; Z consists essentially of at least one element selected from the group consisting of Mn, Fe, Ni, Ti, V and Cr; X consists essentially of at least one element selected from the group consisting of fluorine, oxygen and sulphur, *n* is numerically equal to 1 when X is fluorine and 2 otherwise. Various modifications may be made in this composition. One modification utilizes a combination of rare earths, including samarium, or a mixture of a rare earth and cobalt. These modifications are illustrative of compositions designed to have reorientation temperatures near the device operating point. Other modifications include partial substitutions of a variety of ions to increase mobility and for other purposes.

The second class of materials of interest may be generalized in accordance with the formula:

$$xAO \cdot yBO \cdot zC_2O_3$$

where:

A = Ba, Sr, Ca, Cd, Pb and the 4*f* rare earth ions and/or combinations of ions, the first monovalent and the second trivalent, included in pairs for charge compensation. Such pairs include any of the monovalent ions Li, Na and K with any of the trivalent ions La, Y, Sc, and Bi.

B = the divalent ions of Fe, Co, Ni, Zn, Cu, Mg, and/or Mn.

and

C = the trivalent ions of Fe, Al, Ga, Cr, In, and V as well as any of the enumerated B ions paired with the compensating tetravalent ions Ti, Si, or Ge.

The inventive innovation in every instance involves local variations in cobalt content. This may be accomplished in materials already containing cobalt as well as in materials containing no cobalt in the unmodified form. Cobalt may be included in the unmodified material as a homogenous substituent to alter anisotropy or indeed (in the instance of certain modifications of hexagonal ferrites) to introduce the requisite anisotropy.

To be useful for the purposes of this invention, local cobalt variation should be sufficient to produce an anisotropy variation of the order of at least 1 percent, although for some applications at least an order of magnitude change is preferred. Ordinarily, this anisotropy variation should take place over a distance measured in terms of a few mils down to a fraction of a mil. In the preferred embodiment utilizing materials of the $AZO_3$ stoichiometry, requisite cobalt concentration variations may range from 0.01 ion percent, or less, to a few ion percent, all based on the total number of ions present in the iron site. In a class of devices these local concentration gradients take the form of an increase of concentration of the noted order. In other devices they may take the form of a decrease. Other materials may require larger magnitude gradients. Accordingly, an anisotropy variation of the order of 1 percent is accomplished in the layered hexagonal ferrites by concentration variations of the order of about 0.1 ion percent on the basis aforenoted. In all instances the limitations on concentration variation are determined by desired device design. The limits noted generally correspond to the broad range defining at the one end the minimum variation which may result in an anisotropy variation of device significance and the upper limit corresponding with a limit beyond which further variation is generally not necessary. Of course, from the material preparation standpoint, small quantities are generally desirable since larger amounts may have deleterious effects on crystalline perfection.

Mechanism

Here again the relevant mechanism is generally understood by those familiar with this field. Change in anisotropy may be accomplished in a variety of ways depending on the nature of the material, although in each instance the change is due to cobalt concentration variation. In the orthoferrites, that is in materials of the $AZO_3$ stoichiometry, introduction of relatively small quantities of cobalt (or, in the alternative, reduction in cobalt content) has a pronounced effect on the reorientation temperature $T_r$. At this temperature the easy magnetization direction switches as between the C-axis and the A-axis so that the anisotropy is essentially zero at this temperature. The effect of cobalt concentration is to vary the anisotropy by altering the temperature interval between the operating temperature and $T_r$.

The effect on anisotropy and other materials may be unrelated to any reorientation temperature. In the layered structures, for example, the effect is simply that of dilution by an ion having a large anisotropy that may be opposite in sign to the ions making the major magnetic contribution.

Regardless of the fundamental mechanism, operation of the invention requires that such anisotropy variation take place only over a limited portion of the operative magnetic region.

Contemplated Device Uses

A variety of bubble device designs has been set forth in *The Bell System Technical Journal*, Volume XLVI, 1967, at pp. 1,901–1,925. While certain of the designs described in that reference may utilize the anisotropy gradients of this invention, a number of novel designs suggest themselves. The figures are representative.

FIG. 1 depicts a layer or sheet 1 of an appropriate magnetic material within which a cylindrical portion 2 has been modified by a change in cobalt concentration so as to locally result in a reduction in anisotropy. An obvious use for this configuration is to provide a site of reduced anisotropy for bubble generation and to this end a conducting loop 3 connected to current source, not shown, is provided.

Region 2 of the device in FIG. 1 is so engineered as to manifest a uniaxial anisotropy with easy magnetization out of the plane, as does the rest of the layer 1, but at a very much lower level of anisotropy. As an illustration, in yttrium orthoferrite, the unmodified nucleation field may be at a level of 100,000 oersteds. The nucleation field within region 2 may be reduced three or four orders of magnitude lower by modifying a noncobalt-containing composition with of the order of one-fourth ion percent cobalt (based on total iron). Whereas many of the devices of concern utilize cobalt concentration gradients which are as well defined as possible, the device of FIG. 1 desirably manifests a smooth transition from the modified anisotropy of region 2 to the unmodified anisotropy of the remainder of layer 1. This transition may be expected to occur naturally with most fabrication techniques. It is desired to assure the requisite degree of exchange coupling to enable the nucleated bubble to be moved from the modified region to the surrounding bulk material. It is estimated that the transition from the modified level to the unmodified should occur over a distance of no less than about 1 micron.

Figure 2:
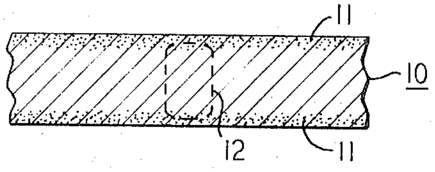
FIG. 2 is an elevational view in section of a portion of a bubble domain device including a surface region having a cobalt concentration different from that of the remainder of the region.

It has been previously proposed that stable bubble domain size be reduced in a typical bubble structure by coating the sheet with a high-permeability layer of a soft magnetic material such as permalloy. These layers have had the desired effect and experimental structures have been operated successfully. The device of FIG. 2 is designed to accomplish the same end by use of at least one region of altered cobalt content. In FIG. 2 this surface is depicted as 11, with the entire broken section of the sheet being denoted 10. A bubble domain 12 is schematically depicted. Region 11 which, for a typical orthoferrite, has an increased cobalt content, serves in the manner of the separate permalloy layer and results in reduced bubble size 12. As compared with the permalloy layer, the cobalt-rich region is transparent to some wavelengths of electromagnetic radiation and permits use of Faraday rotation to sense the presence of bubbles. Construction of display systems is also contemplated.

Figure 3:
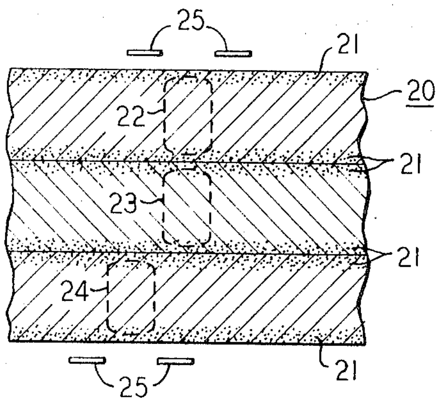
FIG. 3 is a front elevational view in section of a multilayer device in accordance with the invention.

FIG. 3 depicts a section of a more complex device again utilizing planar regions of modified cobalt concentration. The particular device shown has four such regions 21 within magnetic body 20, two of which may define free surfaces and two of which are internal. Bubbles 22 and 24 are propagated in the usual manner, their positions being stabilized by permalloy circuitry represented by elements 25. Bubble 23 in the intermediate region is not controlled directly by external circuitry, but responds to the presence and/or motion of bubbles 22 and 24.

The device of FIG. 3 is illustrative of a family of devices in which various logic functions may be performed. Bubble 23 may follow certain of bubbles 22 or 24 or may respond only to the concerted influence of both. Other devices of this nature utilizing fewer or more layers as well as those depending upon the simultaneous presence of a greater number of bubbles are apparent.

Figure 4:
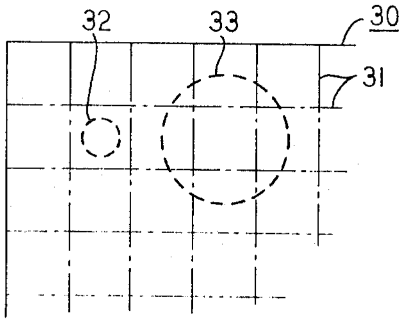
FIG. 4 is a plan view of a portion of a device in which a regular grid of cobalt concentration gradients is utilized to stabilize bubble position.

The device of FIG. 4 depicts a magnetic region 30 containing a gridlike array of altered anisotropy. Lines of the grid are denoted 31. A bubble 32 is included. For the case in which the grid represents a region of lowered anisotropy, the effect is to create stable resting positions for bubbles 32. Such a pattern may replace the permalloy circuitry now commonly in use. In an alternative array, a bubble 33 may encompass four intercepts and such a device may operate as a coincidental current memory. It is apparent that the above devices are merely illustrative and that the description thereof, is applicable also to any materials having the requisite uniaxial properties.

Fabrication

Suitable techniques for controlling cobalt level are known. Planar regions may be created by bulk diffusion methods in which sources are vapor, liquid or solid. Application of source material where it is in contact with the body may be by sputtering, evaporation, dipping, brushing, etc. Fine-scale configurations may be prepared by use of the masking techniques in prevalent use in the fabrication of printed circuitry. A technique which is capable of producing very fine dimensions is ion implantation, and this may serve to produce, for example, the low-anisotropy box structures of FIG. 4. Depending on the pattern desired, implantation may take the usual form or may be in such direction as to result in channeling. See, for example, J. O. McCaldin chapter, *Progress in Solid State Chemistry*, Vol. 2, Ed. H. Reiss, Pergamon Press, Oxford, New York, (1965), pages 2–25.

What is claimed is:

1. Device consisting essentially of a region of magnetic material of the orthoferrite crystallographic structure, said material having uniaxial magnetic anisotropy together with first means for producing a magnetic field across at least a portion of said region so as to effect a local reversal in magnetic polarization, thereby resulting in a single-wall domain evidencing a magnetic polarization opposite to that of adjoining portions of the said region and second means for propagating said domain through at least a part of the said region, said material consisting essentially of a composition of the approximate stoichiometry $AFeO_3$, in which A consists essentially of at least one element selected from the group consisting of the 4*f* rare earth elements, Y, La, and Bi, characterized in that selected portions of said region have a cobalt content which is different from that of other portions and in which the variation in cobalt content as between the portions is sufficient to result in an anisotropy variation of at least 1 percent.

2. Device of claim 1 in which the said selected portions contain a cobalt content which is increased relative to the remaining portions.

3. Device of claim 2 in which the variation in cobalt content is within the range of from 0.01 to 5.0 ion percent based on the total number of Fe ions in the said stoichiometry.

4. Device of claim 3 in which the selected portions are bounded by a free surface plane of the said region.

5. Device of claim 4 in which the said selected portions are bounded by at least one additional plane parallel to the said surface plane.

6. Device of claim 2 in which the said selected portions include an area of reduced anisotropy for serving as a low-energy bubble-generating source.

7. Device of claim 2 in which the said selected portions define a grid of reduced anisotropy.

* * * * *